W. GOELDNER.
CULTIVATOR.
APPLICATION FILED JULY 15, 1913.
1,258,109.
Patented Mar. 5, 1918.
3 SHEETS—SHEET 1.
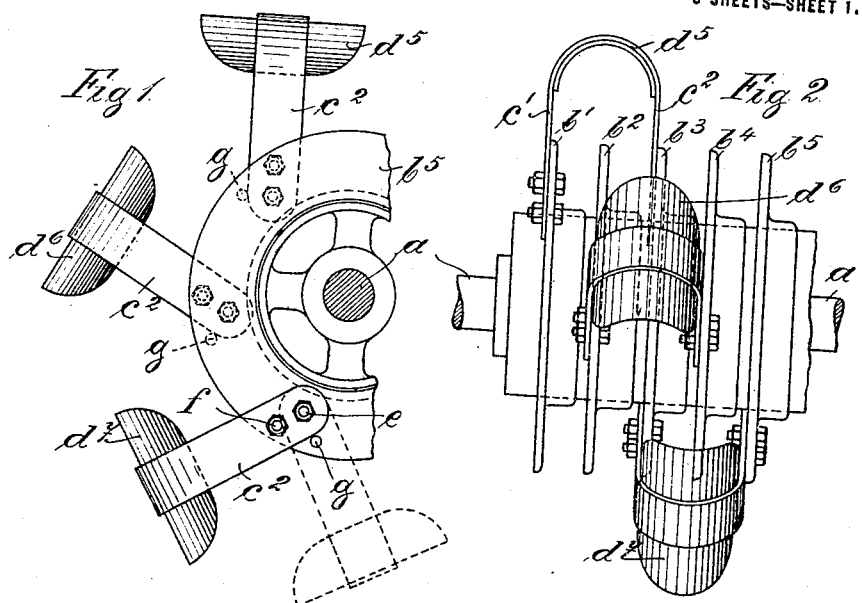
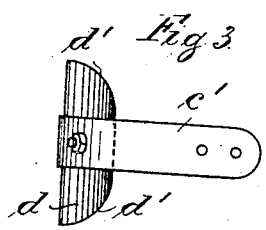
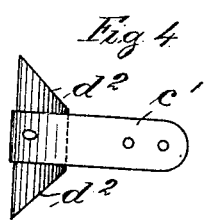
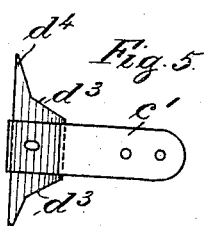
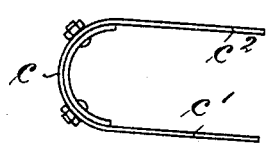
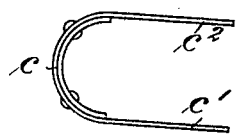
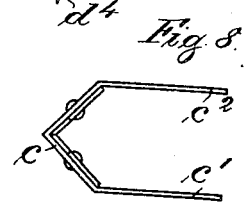
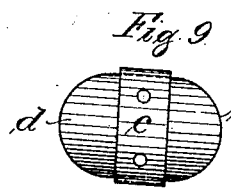
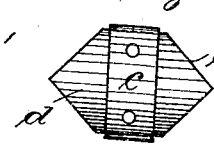
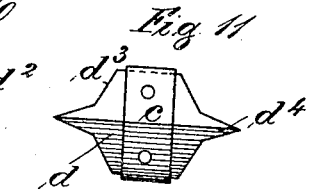
Witnesses:
Charles D Crompton
Fred Pohl
Inventor:
Walter Goeldner
by
Croydon Marks
Attorney

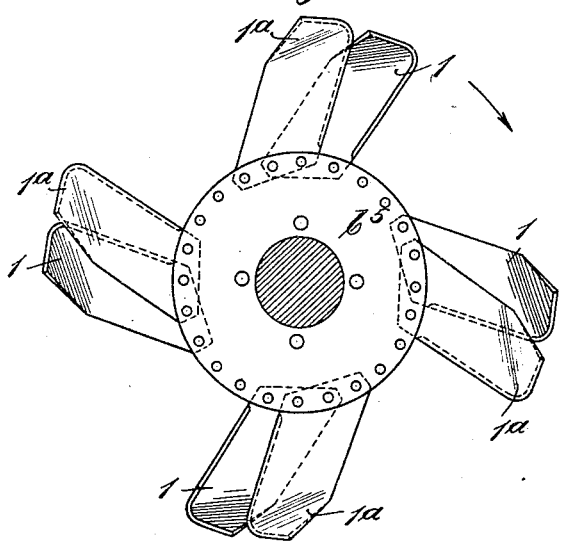
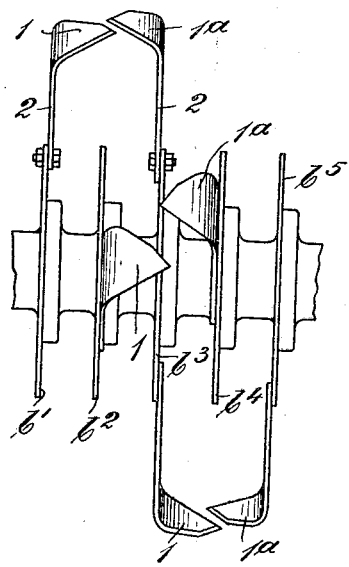
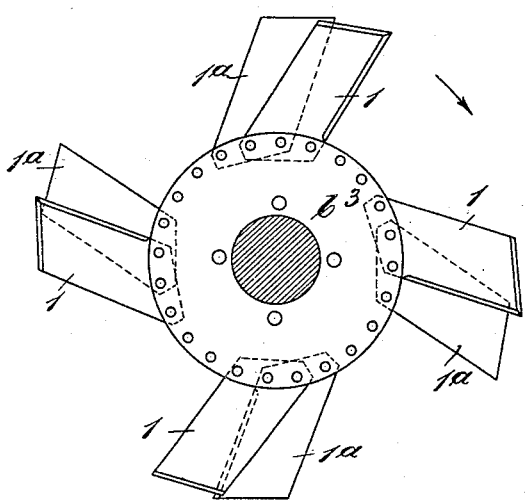
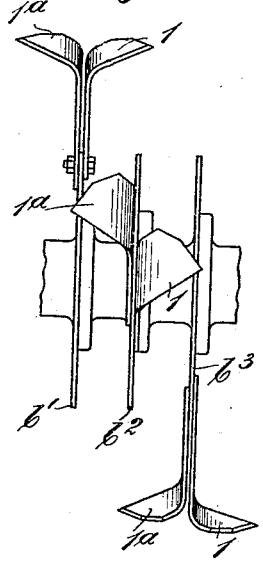

W. GOELDNER.
CULTIVATOR.
APPLICATION FILED JULY 15, 1913.

1,258,109.

Patented Mar. 5, 1918.
3 SHEETS—SHEET 3.

Witnesses:
Charles B Crompton
Fred Pohl

Inventor:
Walter Goeldner
by
E. Broydon Marks
Attorney

UNITED STATES PATENT OFFICE.

WALTER GOELDNER, OF MANNHEIM, GERMANY, ASSIGNOR TO THE FIRM OF HEINRICH LANZ, OF MANNHEIM, GERMANY.

CULTIVATOR.

1,258,109.  Specification of Letters Patent.  Patented Mar. 5, 1918.

Application filed July 15, 1913. Serial No. 779,156.

*To all whom it may concern:*

Be it known that I, WALTER GOELDNER, subject of the King of Prussia, residing at 22 Augusta-Anlage, Mannheim, in the German Empire, have invented certain new and useful Improvements in Cultivators, of which the following is a specification.

This invention relates to rotary cultivators or hoes for agricultural purposes and has for its object to provide a cultivator or hoe which will uniformly break up and loosen the whole surface of the ground over which it travels.

A further object of the present invention is to provide a construction wherein comparatively little resistance is offered by the ground to the hoe carriers or arms, thus enabling the greater part of the power to be transmitted to the hoe blades.

Another object of the invention is to facilitate the reversal of the hoe blades when it is desired to reverse the direction of rotation of the hoe shaft.

The invention further relates to an improved construction of hoe for rotary cultivators so that a better cut is obtained and the soil more uniformly broken up and turned over, while stalks, roots, manure, and the like are thoroughly worked into the ground.

The invention also relates to the construction of the hoe blades and carrier arms therefor, all as hereafter described and set forth in the appended claims.

In order that the invention may be clearly understood reference is made to the accompanying drawings whereon Figure 1 is a fragmentary section through the rotary cultivator and Fig. 2 a fragmentary front view thereof.

Figs. 3, 4 and 5 are side views of different forms of hoe blade, showing the carrier arm attached thereto.

Figs. 6, 7 and 8 are plan views of the hoe blade and carrier arm illustrated in Figs. 3, 4 and 5 respectively and Figs. 9, 10 and 11 are end views corresponding to Figs. 3, 4 and 5.

Fig. 12 is an end view showing a modified form of cultivator and Fig. 13 is a fragmentary front view of the cultivator shown in Fig. 12.

Figs. 14 and 15 are views corresponding to Figs. 12 and 13 showing a further modification.

Fig. 16 is a view showing the sheet-metal blank from which a further modified form of cultivator blade is constructed, Figs. 17 and 18 being front and edge views respectively of the blade constructed from the blank illustrated in Fig. 16, while

Figure 19:
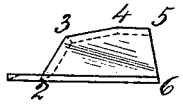
Fig. 19 is an edge view in the direction of the arrow A in Fig. 17.

Referring firstly to Figs. 1 and 2 which illustrate a rotary cultivator adapted to uniformly break-up and loosen the whole ground over which the cultivator travels and which is so constructed that when cutting at medium depths the disks and arms carrying the hoes do not enter the ground, whereas when a deep cut is being made, the arms carrying the hoes, although entering the ground, require to meet only a very slight resistance as the preceding hoe blade loosens the ground in front of the carrier arm.

$a$ designates the cultivator shaft upon which are mounted a plurality of disks $b^1$, $b^2$, $b^3$, $b^4$, $b^5$, etc., to which the hoe blades are secured. The hoe blades are preferably scoop-shaped and provided with double-cutting edges so as to cut in either direction of motion. As illustrated in Figs. 3, 6 and 9 the hoe blades $d$ are preferably semi-circular in cross-section and secured to a U-shaped strap $c$, the arms $c^1$ and $c^2$ of which are secured to the disks $b^1$ to $b^5$, etc., in such a manner that the hoe blades $d$ are arranged helically around the cultivator shaft $a$ and so that each hoe blade overlaps the path of the preceding hoe blade, thus preventing the formation of independent furrows in the ground. The hoe blades $d$ may have either rounded cutting edges $d^1$ as illustrated in Figs. 3, 6 and 9 or pointed cutting edges $d^2$ as illustrated in Figs. 4, 7 and 10. If desired, however, the hoe blades may be angular in cross-section as illustrated in Figs. 5, 8 and 11 and not only provided with inclined cutting edges $d^3$ at the front and rear but also terminate at the front and rear in aciculated ground piercers $d^4$ as clearly seen in Figs. 5 and 11.

The particular form of the hoe blades illustrated in Figs. 3 to 11 facilitates the breaking-up and loosening of the ground in front of the next succeeding carrier arm $c^1$ or $c^2$ so that the latter meets comparatively little resistance on entering the ground.

In order that each hoe blade may overlap the path of the preceding hoe blade, the hoe blades are mounted in position preferably in the manner illustrated in Fig. 2, the carrier arm $c^1$ of the hoe blade $d^5$ being secured to the disk $b^1$, while the carrier arm $c^2$ of the same hoe blade is secured to the disk $b^3$. Similarly the carrier arms of the hoe blade $d^6$ are secured to the disks $b^2$ and $b^4$ and the carrier arms of the hoe blade $d^7$ to the disks $b^3$ and $b^5$ and so on, so that between the carrier arms $c^1$ and $c^2$ of each hoe blade there is a disk to which the carrier arm of the next hoe blade is attached.

It will of course be understood that in order to obtain a still more uniform cultivation of the whole surface of the ground over which the cultivator travels, the hoe blades instead of overlapping one-half of the path of the preceding hoe blade as in the construction illustrated in Fig. 2, may be arranged to overlap more than half of the path of the preceding hoe blade by attaching the carrier arms of each hoe blade to the first and fourth or first and fifth disk or so on, so that two or more disks are intermediate the carrier arms of each hoe blade.

The carrier arms $c^1$, $c^2$ as illustrated in Figs. 1 and 2 are secured to the disks $b^1$, $b^2$, $b^3$, etc., by means of two bolts $e$, $f$, the carrier arms being adapted to be turned about the bolt $e$ on removing the bolt $f$ and secured in the position illustrated in dotted lines in Fig. 1 on passing the bolt $f$ through the bolt hole $g$, thus enabling the position of the hoe blades to be reversed when it is desired to reverse the direction of rotation of the cultivator shaft $a$.

Instead of supporting each hoe blade by means of a double-armed strap as hereinbefore described, the hoe blades may be divided so as to form a pair of hoe blades each supported by a single carrier arm, the blades of each pair being bent toward each other and at an angle to each other as clearly shown in Figs. 12 to 15, so that the hoe blades of each pair practically cross over each other, it being therefore necessary to set one of the hoe blades of each pair slightly in advance of the other.

Referring to Figs. 12 and 13: 1 and $1^a$ designate the hoe blades of each pair, each being carried at the end of an arm 2 secured to the disks $b^1$, $b^2$, $b^3$, etc., the hoe blade 1 of each alternate pair being slightly in advance of the hoe blade $1^a$ of the same pair and slightly overlapping the path of the hoe blade $1^a$, the blades 1 and $1^a$ of each pair being bent toward each other and at an angle to each other, as clearly seen in Fig. 13. It will be noted that in this case also each pair of hoe blades overlaps the path of the preceding pair.

Figs. 14 and 15 illustrate a modification of the arrangement illustrated in Figs. 12 and 13. The hoe blade 1 on the disk $b^1$ is arranged slightly in advance of the hoe blade $1^a$ of another pair of hoe blades mounted on the same disk $b^1$, so that the hoe blade 1 on the disk $b^1$ cuts slightly in advance of the hoe blade $1^a$ on the same disk. As the hoe blade 1 on the disk $b^1$ requires to withstand a greater resistance than the blade $1^a$ on the same disk, it is desirable to compensate therefor and for this purpose the hoe blades 1 of each pair are arranged successively in advance of and in the rear of the blade $1^a$ on the same disk alternately, as seen in Figs. 14 and 15, where it will be seen that the hoe blades 1 on the disks $b^1$ and $b^3$ are in advance of the hoe blades $1^a$ on the same disks, whereas the blade $1^a$ on the disk $b^2$ is in the rear of the hoe blade 1 on the same disk.

Figure 16:
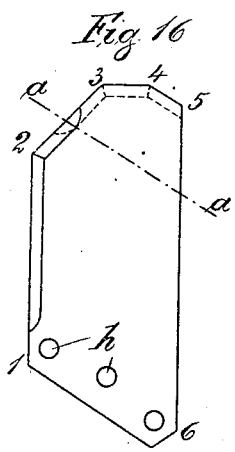

Figs. 16 to 19 illustrate one form of the improved cultivator blade, Fig. 16 illustrating the sheet-metal blank from which the cultivator blade is produced. As clearly seen in Fig. 16 the blade is cut out to form an irregular figure 1—2—3—4—5—6, the edges 1—2, 2—3 and 3—4 forming obtuse angles with each other and being beveled to form cutting edges in the usual manner. The blade is secured to the disks on the cultivator shaft by means of bolts passed through the bolt holes $h$. On striking the ground a sharp angle open toward the front is thus formed between the ground and the edges 2—3 or 3—4, so that stalks or the like cannot escape toward the rear along the edge 1—2 but are severed by the cutting edges 2—3 and 3—4 or are forced toward the front and subjected to the action of the next succeeding cut. As the hoe blade leaves the ground the two edges 2—3 and 3—4 form an incline with the ground so that any stalks or the like in front of these edges remain upon the ground and cannot cling to the edge 1—2. The edge 4—5 is parallel or substantially parallel to the line $a$—$a$ about which the outer end of the blade is bent, so that the edge 4—5 does not exert a cut but provides the largest possible turning over surface $a$—3—4—5—$a$, thus insuring efficient turning over of the ground. The line $a$—$a$ about which the outer end of the blade is bent forms an angle tangent to the circle described by the blades, in the usual manner.

The turning over surface $a$—3—4—5—$a$ may be either perfectly flat or suitably curved to increase the turning over effect so as to approximate to the ordinary plow share.

In the modified form of cultivator blade illustrated in Figs. 20 to 23, the blade is formed with three cutting edges 1—2, 2—3 and 3—4 while the edge 4—5 constitutes the back of the blade, the outer end of the blade being bent about the line a—a between the lines a—a and b—b, while the extreme end b—3—4—b is substantially at right angles to the plane of the blade.

Figure 17:
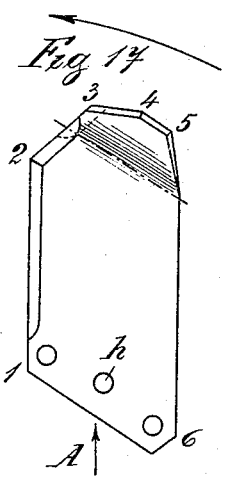
Figure 18:
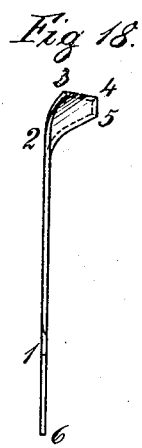
Figure 23:
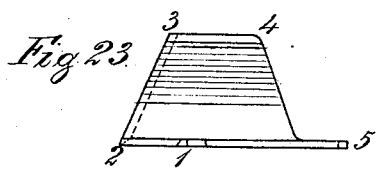
Figs. 20 to 23 are views corresponding to Figs. 16 to 19, showing a slightly modified form of cultivator blade.
Figure 20:
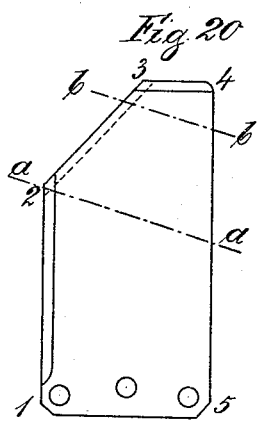
Figure 21:
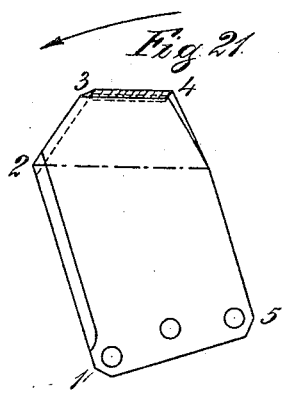
Figure 22:
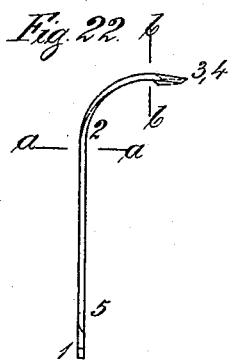

The cultivator blade illustrated in Figs. 21 to 23 is particularly suitable for deep cutting whereas the blade illustrated in Figs. 17 to 19 is more suitable for preliminary hoeing.

I claim:—

1. A rotary cultivator comprising a shaft and a plurality of hoes, comprising hoe blades and carrier arms, arranged helically upon said shaft so that each hoe overlaps at least one-half of the path of the preceding hoe.

2. A rotary cultivator comprising a shaft and a plurality of scoop-shaped hoes arranged helically upon said shaft so that each hoe overlaps a substantial portion of the path of the preceding hoe.

3. A rotary cultivator comprising a shaft and a plurality of hoes of angular cross-section arranged helically upon said shaft so that each hoe overlaps a substantial portion of the path of the preceding hoe.

4. A rotary cultivator comprising a shaft, a plurality of disks thereon, and a plurality of hoes secured by carrier arms to said disks in such manner that the hoes are arranged helically about the shaft and each is entirely overlapped by one or more of the others.

5. A rotary cultivator comprising a shaft, a plurality of disks thereon, a plurality of hoes, and members supporting said hoes and secured to said disks in such a manner that hoes secured to disks separated by at least one intervening disk substantially meet over the said intervening disk or disks.

6. A rotary cultivator comprising a shaft, a plurality of disks thereon, a plurality of hoes, and a pair of members supporting each hoe and secured to said disks in such a manner that one of said disks is interposed between each pair of said members so that each hoe overlaps the path of the preceding hoe.

7. A rotary cultivator comprising a shaft, a plurality of disks thereon, a plurality of hoes having double cutting-edges, and members supporting said hoes and pivotally secured to said disks so as to enable the adjustment of said hoes relative to said disks according to the direction of rotation of said shaft.

8. A rotary cultivator having elongated scoop-shaped hoes supported on both of their sides.

9. A rotary cultivator having scoop-shaped hoes provided with double cutting-edges so as to cut in either direction of motion.

10. A rotary cultivator having scoop-shaped hoe blades V-shaped in cross-section.

11. A rotary cultivator having hoes whose blades are V-shaped in cross-section and are supported on both of their sides.

12. A rotary cultivator having hoes V-shaped in cross-section and with acicular ground piercers.

13. A rotary cultivator having scoop-shaped hoes provided with double cutting-edges so as to cut in either direction of motion and terminating at the front and rear in acicular ground piercers.

14. A rotary cultivator having holes of angular cross-section terminating at the front and rear in acicular ground piercers.

15. A rotary cultivator having scoop-shaped hoes each of which is provided with a central forward projection forming a pointed cutting edge.

16. A rotary cultivator having scoop-shaped hoes provided with pointed cutting edges and arranged helically so as to partially overlap each other.

17. A rotary cultivator comprising a shaft, a plurality of disks thereon, and a plurality of hoes secured by carrier arms to said disks, the carrier arm secured to each disk in substantially the same angular position with respect to the shaft as a second carrier arm secured to a non-adjoining disk, in such manner that the hoes are arranged helically and each substantially overlaps the path of another.

In testimony whereof I have affixed my signature in presence of two witnesses.

WALTER GOELDNER.

Witnesses:
JOSEPH PFEIFFER,
HANS MEYER.

Copies of this patent may be obtained for five cents each, by addressing the "Commissioner of Patents Washington, D. C."